US006761660B2

(12) United States Patent
Lim

(10) Patent No.: US 6,761,660 B2
(45) Date of Patent: Jul. 13, 2004

(54) TRANSMISSION INTERNALLY MESHING A PLANETARY GEAR STRUCTURE

(75) Inventor: Sun-Ho Lim, Kangnam-Ku (KR)

(73) Assignee: Sejin iGB Co., Ltd., Buchon (KR)

( * ) Notice: Subject to any disclaimer, the term of this patent is extended or adjusted under 35 U.S.C. 154(b) by 0 days.

(21) Appl. No.: 10/016,720

(22) Filed: Dec. 10, 2001

(65) Prior Publication Data

US 2002/0052262 A1 May 2, 2002

(30) Foreign Application Priority Data

Apr. 27, 2000 (KR) .......................... 2000-22556

(51) Int. Cl.⁷ ................................................. F16H 1/32
(52) U.S. Cl. ........................................ 475/179; 475/162
(58) Field of Search ............................... 475/178, 179, 475/162

(56) References Cited

U.S. PATENT DOCUMENTS

| 4,348,918 A | 9/1982 | Fukui | 74/805 |
| 4,690,010 A | 9/1987 | Matsumoto et al. | 74/469 |
| 4,967,615 A | 11/1990 | Mills | 74/117 |
| 5,431,605 A | 7/1995 | Ko | 475/168 |
| 5,472,384 A | * 12/1995 | Haga | 475/162 |
| 6,033,333 A | 3/2000 | Muraki et al. | 475/178 |

FOREIGN PATENT DOCUMENTS

| EP | 0 305 535 | | 3/1989 |
| EP | 0 470 741 | | 2/1992 |
| EP | 0 548 888 | | 6/1993 |
| JP | 04046242 A | * | 2/1992 |
| JP | 4-106543 | | 9/1992 |
| JP | 04-370442 | | 12/1992 |
| JP | 05-172194 | | 7/1993 |
| JP | 08226498 A | * | 9/1996 |
| JP | 10252638 A | * | 9/1998 |
| JP | 11173386 A | * | 6/1999 |
| JP | 11210843 A | * | 8/1999 |
| KR | 242 207 B | | 3/2000 |

* cited by examiner

Primary Examiner—Ankur Parekh
(74) Attorney, Agent, or Firm—Harness, Dickey & Pierce, P.L.C.

(57) ABSTRACT

The present invention relates to a transmission internally meshing a planetary gear structure; more particularly, to a reducer that makes it possible to maintain the precision and continuity of power transmission reliably and also to be miniaturized, comprising a frame body provided with a toothed gear internally meshed thereto; a first shaft provided with a sun gear; a plurality of planetary gears operably coupled to the sun gear; a number of crank structures mechanically coupled to corresponding planetary gears; a planetary gear structure mechanically coupled to the crank structures and operably engaged with the toothed gear of the frame body; and a second shaft mechanically coupled to the crank structures.

6 Claims, 5 Drawing Sheets

TRANSMISSION INTERNALLY MESHING A PLANETARY GEAR STRUCTURE

FIELD OF THE INVENTION

The present invention relates to a transmission internally meshing a planetary gear structure used as a reducer for controlling an automated and precision control machine such as a numerical controlled apparatus.

In general, automated and precision control machines equipped with reduction gears to reduce high rotary speed conveyed through a motive axis of power source such as an electric-powered motor or a servomotor. The reducer gears are required to move precisely and to be miniaturized, in order to reduce a size of an automated and a precision control machines and to increase precision of automated and precision control machines.

BACKGROUND OF THE INVENTION

One of the conventional reducers is an RV series of Vigo Drive™ developed and marketed by Teijin Seiki. The RV series of Teijin Seiki has been endowed with a plurality of pinch differences and a plurality of first-step reduction gears at an output end for securing an insertion space for a motive axis of power source inside an input shaft, thus conveying deceleration movement.

The RV series of Teijin Seiki, however, have the following problems:

(1) Since a plurality of pinch differences is used, a deceleration ration is frequently calculated as non-terminating decimals when calculating the deceleration ratio. Therefore, errors are accumulated when the reducer is frequently used and it leads to a decrease in the precision of deceleration movement.

(2) The RV series of Teijin Seiki can be comfortably applied to high-reduction gear ratio, as the diameter of an output end of the input shaft is made small in order to place a first-step reduction gear at the output end. However, extra parts are required when it is applied to low-reduction gear ratio, thus making the reducer bigger.

(3) Since first-stage reduction gears are located at an output end, extra parts for oil-sealing are required in order to prevent oil leakage such as grease from the circumferential portion of the first-step reduction gears. Therefore, the manufacturing cost and weight are increased.

(4) Since a first-step reduction gear is located at an output end, the length of an insertion space in an input shaft is ensured for the insertion of a motive axis of power source. However, the caliber of the insertion space is limited exceedingly due to the use of pinch differences.

(5) When installing a first-step reduction gear at an input end to address the above problems, the diameter of the insertion space for the motive axis insertion of power source gets very small due to the first-step reduction gear in a body with a prescribed diameter and the deceleration range gets limited exceedingly.

(6) Because pinch differences are adopted, the number of pins accommodated in a predetermined body gets limited due to the diameter of a pin—about 2 mm, thus making the deceleration range limited exceedingly.

Another reducer with an internal planetary gear is described in detail in commonly owned Korean Patent No. 242207, which is incorporated herein by reference as if fully set forth herein. The reducer comprises a main crank structure that is combined with a motive axis of power source in an Oldham coupling method. The reducer receives the conveyed rotary power from the power source, a plurality of planetary gears. The plurality of planetary gears conducts deceleration movement translating and rotating according to the rotation of supplementary crank structures and a plurality of supplementary crank structures that execute translation and rotation movement engaged with the planetary gears.

The reducer of the Korean Patent No. 242207, however, has cases where the rotary movement of the main crank structure and the supplementary axes are not perfectly aligned with each other. For example, the perfect alignment may not be achieved due to reasons of processing, assembling and deformation, as the supplementary crank structures are connected to the planetary gear that translate and rotate at the same time. In other words, the rotation of the supplementary crank structures is not regulated. Here, when the supplementary crank structures move, or when load is added from outside, a problem arises in that the supplementary crank structures vibrate periodically to the rotating direction, thereby dropping the qualities of precision and continuity of power transmission.

SUMMARY OF THE INVENTION

It is, therefore, an object of the present invention to provide a transmission internally meshing a planetary gear structure that can maintain the precision and continuity of power transmission reliably and also can be miniaturized. In this manner, problems of the conventional technologies mentioned above can be addressed.

It is another object of the present invention to provide a transmission internally meshing a planetary gear structure which is easy to oil-seal, and applicable to both high-reduction gear ratio and low-reduction gear ratio, thus making the reducer inexpensive and small.

A transmission internally meshing a planetary gear structure comprises: a body wherein an internal gear is formed on an outer circumferential surface; an input shaft wherein formed are serration on the outer circumferential surface and an insertion space inside for power source connection; a plurality of first planetary gears wherein formed are serrations that fit with those of the input shaft, thereby moving engaged with the input shaft; a plurality of crank structures which are equipped with both a number of coaxial lines having the identical axis and a number of eccentric components that is, located between the coaxial lines, having a predetermined eccentric amount but with phase differences to each other, and which rotate by the rotary movement of the first planetary gears; second planetary gears wherein the planetary gears are formed along the outer circumferential surface and engaged with the internal gears of the body, also formed is a central hole that the input shaft penetrates in the center and the eccentric components of the crank structures pass through a circumferential portion and conduct translation and rotation movement to the rotary movement of the crank structures; a precession prevention plate wherein a central hole penetrated by the input shaft is formed in the center, the coaxial lines at the back end of the crank structures penetrate the circumferential portion so that they are connected, and the generation of the precession is blocked when the crank structures rotate; and an output shaft plate wherein a central hole that the input shaft penetrates in the center, of which the circumferential portion is combined to the coaxial lines of the fore end of the crank structures and conveys the rotary power of the crank structures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Referring to the accompanying FIGS. 1 to 6, a transmission internally meshing a planetary gear structure of a preferred embodiment of the present invention will be described in detail hereinafter.

Figure 1:
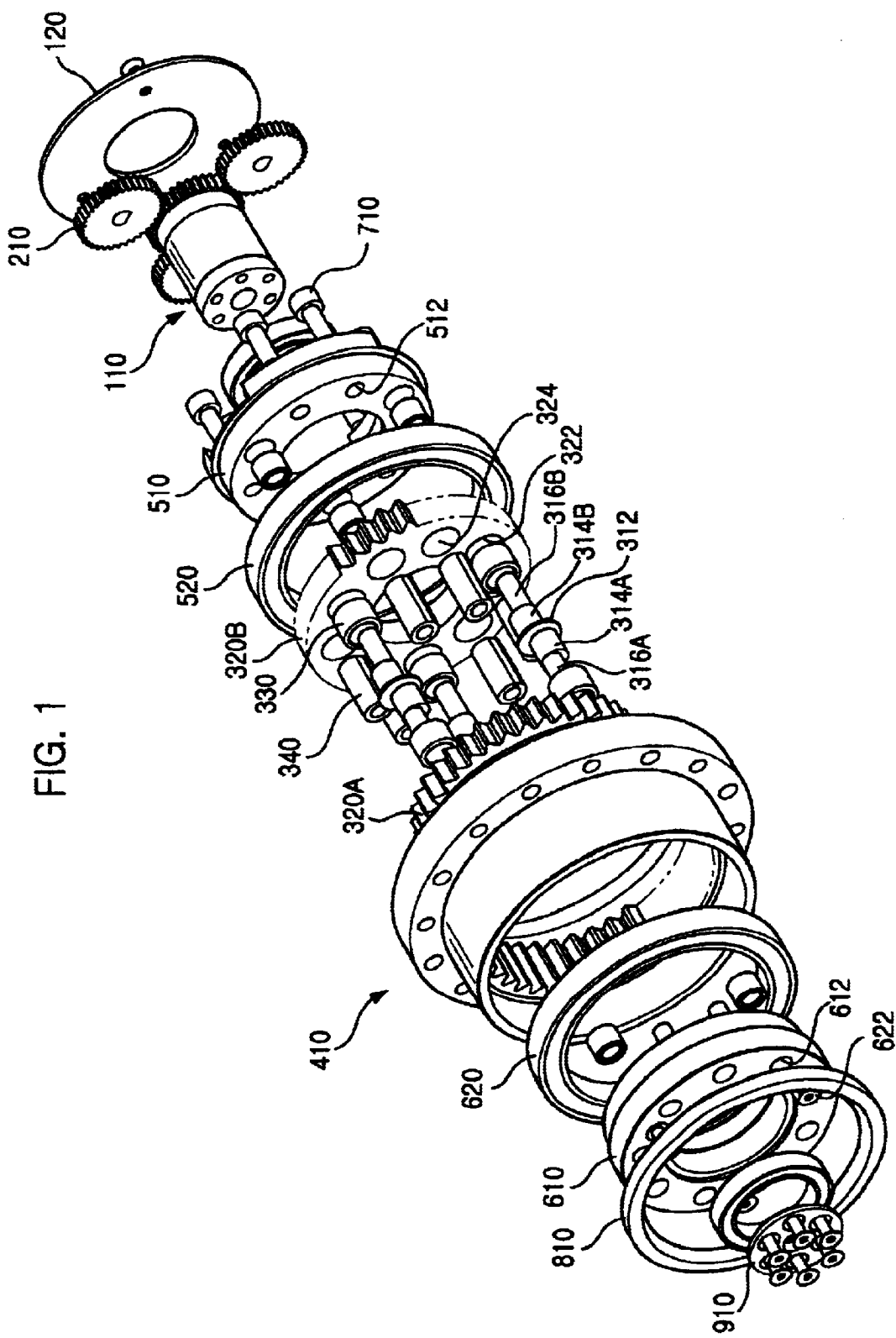
FIG. 1 is a disassembled schematic view illustrating a transmission internally meshing a planetary gear structure in accordance with the present invention.
Figure 2:
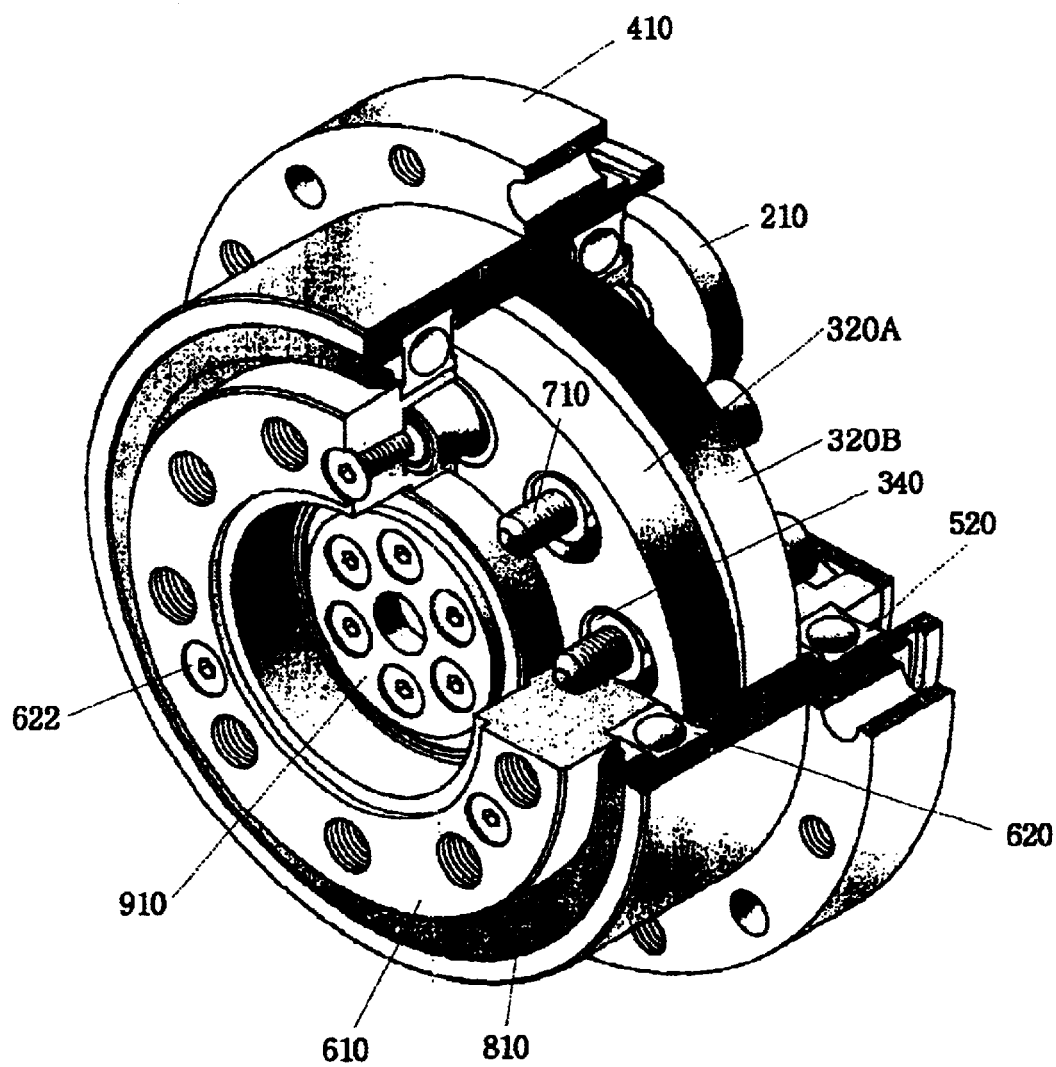
FIG. 2 shows an assembled schematic view depicting a transmission internally meshing a planetary gear structure in accordance with the present invention.
Figure 3:
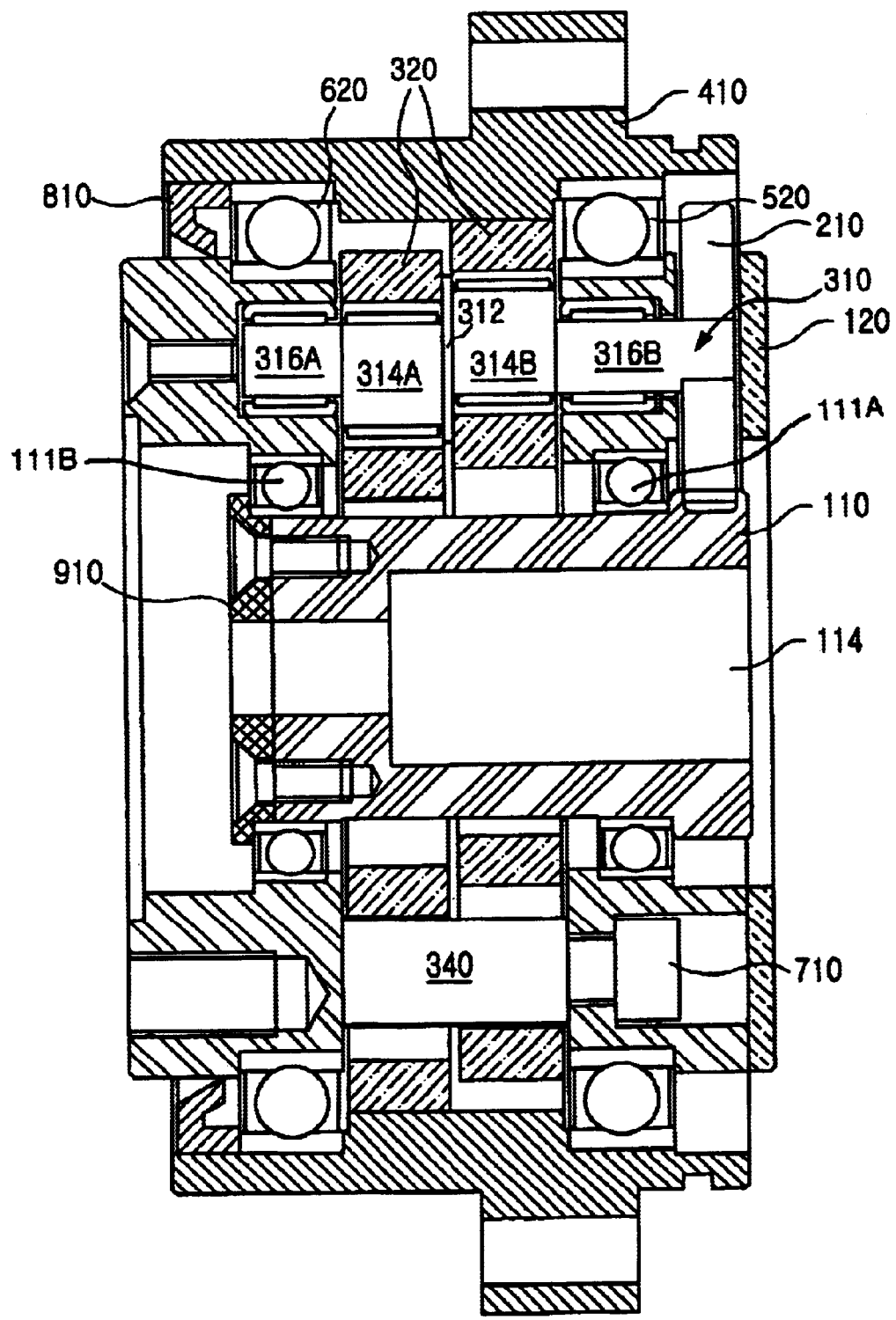
FIG. 3 represents a cross-section showing a transmission internally meshing a planetary gear structure in accordance with the present invention.

As shown in FIGS. 1 to 3, a transmission internally meshing a planetary gear structure of the present invention is connected to a power source such as servo motor, and includes an input shaft 110 formed with a tooth-shaped surface 112 at the outer circumferential surface of the back end; a plurality of primary planetary gears 210 engaged with the tooth-shaped surface 112 at the input shaft 110 of the back end; and a plurality of crank structures 310 fixed at each of the primary planetary gears 210.

In the preferred embodiment, the number of primary planetary gears 210 and the number of crank structures 310 are 3, respectively.

Figure 4:
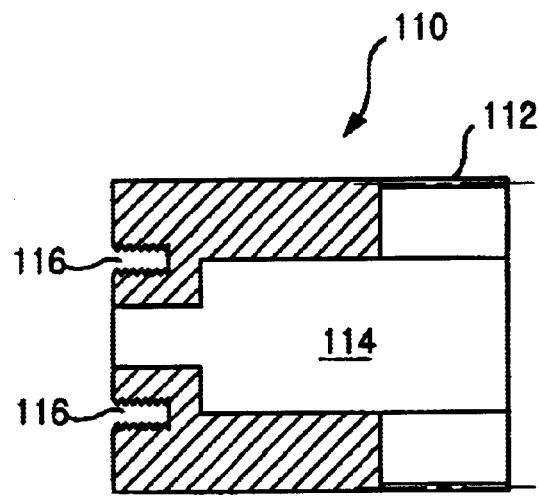
FIG. 4 depicts a cross-section view illustrating an input shaft of a transmission internally meshing a planetary gear structure in accordance with the present invention.

As shown in FIG. 4, the input shaft 110 is a hollow cylinder that has an insertion space 114 formed inside for connecting a motive axis of power source thereto and a number of screw holes 116 formed at a predetermined interval for connecting bolts to join the front end of the input shaft 110 to a fixing plate which will be described later. The input shaft 110 rotates by power transmitted from the power source through the motive axis of the input shaft. The input shaft 110 and the primary planetary gears 210 are supported and constrained by multiple bearing around the crank structure 310.

Figure 5:
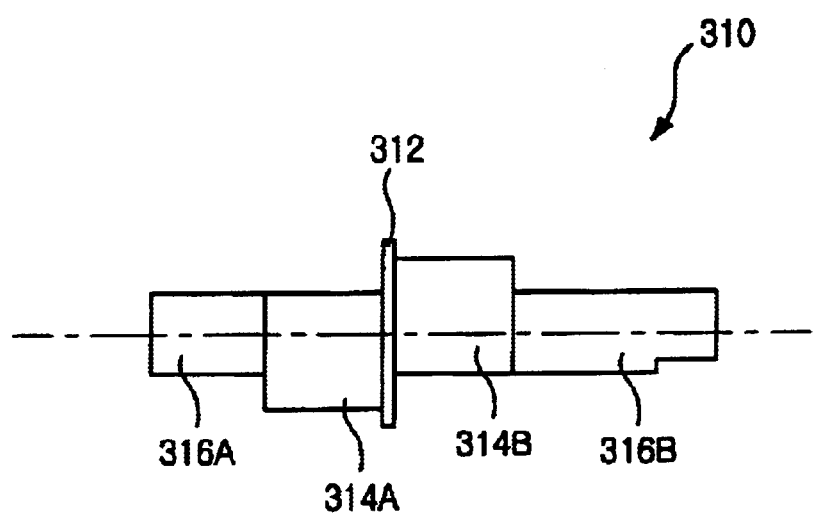
FIG. 5 presents a side view showing crank structures of the transmission shown in FIG. 3.
Figure 6:
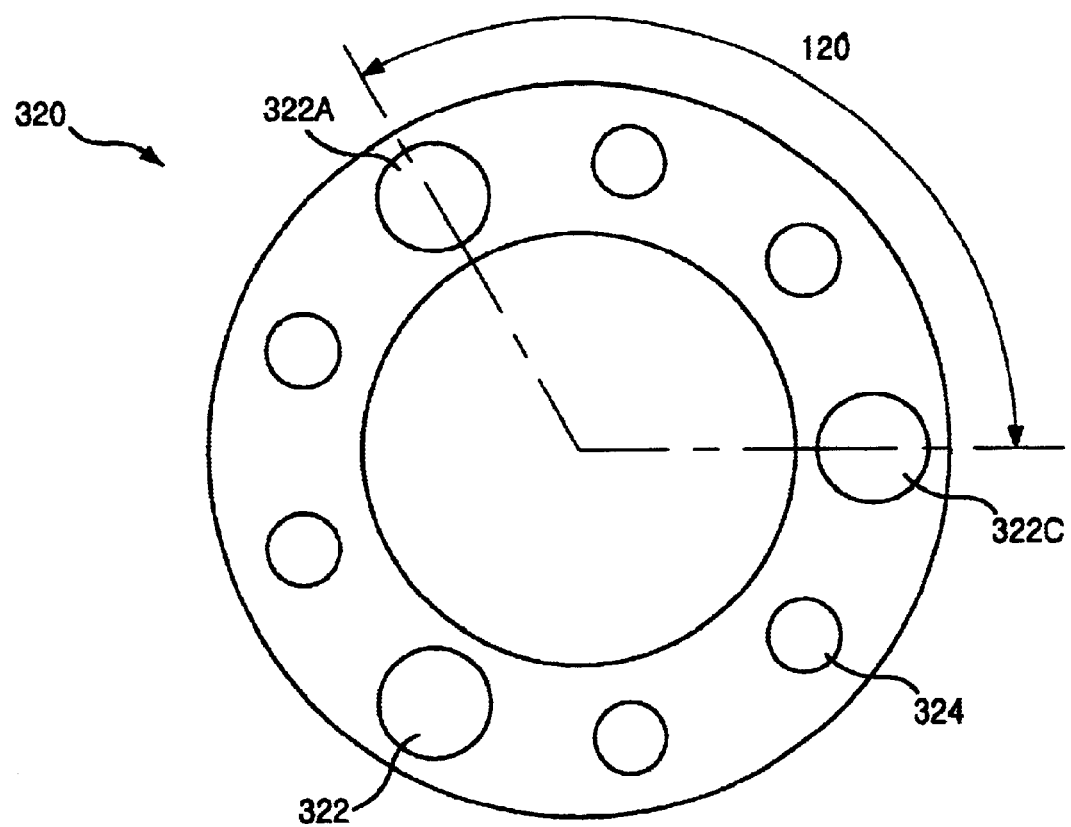
FIG. 6 is a plan view representing the transmission internally meshing a planetary gear structure in accordance with the present invention.

As shown in FIG. 5, each of the crank structures 310 includes a disk 312 with predetermined thickness, eccentric components 314A and 314B formed at both sides of the disk 312, respectively; and a couple of coaxial lines 316A and 316B formed at the ends of the eccentric components 314A and 314B. Here, the disks 312, the eccentric components 314 and the coaxial lines 316 are integrated into a body. The eccentric components 314A and 314B at both sides of the disk 312 are located eccentrically to the central axis of the disk 312. An eccentric component 314A at one side of the disk 312 and an eccentric component 314B at the other side of the disk 312 have a phase difference of 180° to each other. Also, the central axis of the two coaxial lines 316A, 316B is perfectly aligned with that of the disk 312. The coaxial lines 316A, 316B at the back end of the disk 312 are connected to the center of the primary planetary gears 210, therefore, the rotary movement of the input shaft 110 is conveyed to the crank structures 310 through the primary planetary gear 210 when the input shaft 110 rotates. Here, the crank structure 310 rotates and revolves on its own axes.

The eccentric components 314A, 314B at both sides of the crank structure 310 support each of the two planetary gears 320A, 320B so that the planetary gears 320A, 320B can be moved. The two planetary gears 320A, 320B perform cycloid motion by the eccentric amount of the two eccentric components 314A, 314B when the crank structure 310 rotates. Bearings 330 installed between the eccentric components 314A, 314B and the planetary gears 320A, 320B help the crank structures 310 rotate smoothly. Here, the two planetary gears 320A, 320B are positioned closely to each other at both sides of the disks 312 with a gap just less than the thickness of the disks 312 between them. Therefore, when conducting rotation and translation movement, the two planetary gears 320A, 320B are prevented from contacting each other and generating frictional heat and abrasion.

Each of the two planetary gears 320A, 320B has a shape of a disk and a number of pass-through holes are formed in predetermined intervals. Also, a gear is formed on the surface. In the present embodiment of the present invention, the pass-through holes of both planetary gears 320A, 320B are classified into three holes for the crank structures 310 and six holes for consolidating pins 340. The consolidating pins 340 are hollow cylinders tapped on the inner circumferential surface. The consolidating pins 340 tie firmly an anti-gyration plate 510 and an output shaft 610. Also, the consolidating pins 340 distribute load evenly and easily adjust preload amount on main bearings 520, 620. By keeping a predetermined distance between the main bearings 520, 620, they can ensure the moment load for outside load caused by the main bearings 520, 620, thus the moment rigidity of the reducer is maintained. In this case, the pass-through holes for crank structures 322 are positioned at an interval of 120°, and between two adjacent pass-through holes for crank structures 322, two holes for consolidating pins 324 are arranged with predetermined intervals.

The two planetary gears 320 are installed in a body 410 with internal gears on the inner circumferential surface thus the two planetary gears 320 are engaged with the body 410.

The coaxial lines 316A, 316B at the back end of the crank structures 310 are supported by the anti-gyration plate 510 with mediation of bearings in order to be rotated, while the coaxial lines 316A, 316B at the crank structures 310 of the front end are rotating and they also are supported by the output shaft 610 with mediation of bearings. The anti-gyration plate 510 is rotated by the rotary of the crank structures 310 and prevents the gyration of 310 on its own axis while it enhances the output shaft 610. The output shaft 610 is rotated by the rotary of the crank structures 310 and transmits the rotary power outside. Here, the coaxial lines 316A, 316B at the back end of the crank structures 310 pass through the anti-gyration plate 510 and they are connected to the primary planetary gears 210.

On the outer circumferential surface of the anti-gyration plate 510 and the output shaft 610, a first and second main bearings are installed and they smooth the rotation of the output shaft 610. Also, bearings are installed between the input shaft 110, the anti-gyration plate 510 and the output shaft 610 for the smooth rotation of the input shaft 110. At the circumferential portion corresponding to the pass-though holes of the planetary gears 320 of the anti-gyration plate 510, a number of screw holes are formed respectively and strength-maintenance bolts are engaged at the screw holes. The strength-maintenance bolts 710 are bound to the consolidating pins 340 inserted into the planetary gears 320 through the screw holes on the anti-gyration plate 510.

The strength-maintenance bolts 710 improve the deflection amount in the radial direction of a reducer by load from outside when a first and a second main bearings 520, 620 are pressed.

A number of screw holes 612 are formed at predetermined intervals on the circumferential portion of the output shaft 610 and the screw holes 612 are used as charge/discharge for lubricant or grease inside a reducer. Preferably, the number of screw holes 612 is 3. In this embodiment, the screw holes of the output shaft are filled hermetically with bolts engaged therein. The screw holes of bolts 622 are used for preventing the generation of impact in axis-direction on components related to the crank structures 310 by determining and supporting the position of the axis direction of the crank structures 310 when a reducer is assembled wherein crank structures are already assembled and then the planetary gears are fitted in. Also a plurality of holes is formed between two adjacent screw holes at regular intervals to which external apparatuses such as links are equipped.

An oil-seal 810 is equipped between the output shaft 610 and the body 410 and the oil-seal 810 prevents the leakage of lubricant such as grease inside a reducer.

Meanwhile, in the center of the anti-gyration plate 510, a central hole is formed by penetrating the two planetary gears 320 and the output shaft 610. The fore part of the input shaft 110 can be passed through to the fore part of the input shaft 110. A fixing plate 910 is joined firmly with a number of bolts that constrain the possible axial movement of the input shaft 110.

The operation of a transmission internally meshing a planetary gear structure constituted as mentioned above in accordance with the present invention is explained hereinafter.

When an outside power source motivates a motive axis into rotation, an input shaft 110 connected to the motive axis is rotated. In turn, a plurality of primary planetary gears 210 engaged with outer circumferential surface of the input shaft 110 are rotated.

Here, rotary power transmitted from each-of the primary planetary gears 210 is passed to the crank structures connected to the primary planetary gears 210 and the crank structures 310 are rotated and revolved. In this case, as rotating and revolving, the crank structures 310 conduct deceleration movement in proportion to a predetermined deceleration ratio, that is, an engagement ratio between the input shaft 110 and the planetary gears 210 joined thereto. The two planetary gears at the eccentric components 312 of the crank structures 310 carry out translation and rotation movement.

The deceleration movement of the crank structures 310 is transmitted to the output shaft 610. The deceleration movement in proportion to the deceleration ratio is transmitted as mentioned above.

As mentioned above, various effects of the present invention are described hereinafter.

By directly connecting an end of the coaxial lines of the crank structures to the primary planetary gears, which are engaged with the input shaft, the rotary movement of the crank structures is bound by the primary planetary gears, thus vibration generated from the rotation of the crank structures in the conventional technologies is restrained. As a result, the precision and continuity of power transmission can be maintained reliably.

By using internal planetary gears, it is easy to control the size of an insertion space inside an input shaft for the insertion of a motive axis of power source and the deceleration movement of precision control machines can be maintained reliably because cases of deceleration ratios calculated in interminating decimals decrease.

By using internal planetary gears, gears can be miniaturized with a wide range of speed reduction/increase.

Since primary planetary gears located in an input end, oil sealing at an output end is easy to provided, and it's possible to enlarge primary planetary gears inside a limited body size, thus it allows a reducer to embody high-deceleration ratio and low-deceleration ratio without making the reducer bigger.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A transmission planetary gear structure, comprising:
   a frame body with an internal gear formed on the frame body;
   an input shaft provided with an insertion space therein and a toothed gear on an peripheral surface of the input shaft for power source connection;
   a plurality of first planetary gears operably engaging with the toothed gear of the input shaft;
   a plurality of crank structures, wherein each crank structure is equipped with both a number of coaxial lines having the identical axis and a number of eccentric components which, located between the coaxial lines, have a predetermined eccentric amount but with phase differences from the central axis to each other, and wherein, an end of the coaxial lines being connected to the first planetary gears, a plurality of the coaxial lines translate and rotate by the rotary movement of the first planetary gears;
   a plurality of second planetary gears, which is formed along the outer circumferential surface and engages with the internal gears of the body, wherein formed is a central hole that the input shaft penetrates in the center, and the eccentric components of the crank structures pass through a circumferential portion and the second planetary gears conduct translation and rotation to the rotary movement of the crank structures;
   a precession prevention plate with a central hole penetrated by the input shaft, wherein the coaxial lines at the crank structures of the back end penetrate the circumferential portion so that they are connected, and the generation of the precession is prevented while the crank structures rotate; and an output shaft plate with a central hole penetrated by the input shaft, of which the circumferential portion is combined to the coaxial lines at the front end of the crank structures, and conveys the rotary power of the crank structures.

2. The transmission of claim 1, wherein a plurality of pass-through holes is formed at a regular interval on the circumferential portions of second planetary gears, the precession prevention plate and the output shaft plate, and further included is a plurality of strength-maintenance materials that assist the balance and strength of the translation and rotation movement of the second planetary gears.

3. The transmission of claim 2, wherein a plurality of the strength-maintenance materials includes:

a number of hollow consolidating pins inserted into pass-through holes formed on the circumferential portion of the second planetary gears; and a number of strength-maintenance bolts inserted into pass-through holes formed on the circumferential portion of the precession prevention plate engaged with a plurality of the consolidating pins.

4. The transmission of any of claim 1 to 3, wherein each of the crank structures includes a disk which, located between the second planetary gears, keeps apart the both sides of the second planetary gears at a predetermined distance.

5. The transmission of claim 4, wherein further included is oil-sealing materials preventing oil inside the body from leaking out.

6. The transmission of claim 5, wherein the disk, a pair of the coaxial lines and a pair of eccentric components located between the two coaxial lines are integrated into a body.

* * * * *